United States Patent
Bolshtyansky et al.

(10) Patent No.: US 11,914,040 B2
(45) Date of Patent: Feb. 27, 2024

(54) SPATIALLY RESOLVED PERTURBATION DETECTION USING LINE MONITORING SYSTEM

(71) Applicant: SUBCOM, LLC, Eatontown, NJ (US)

(72) Inventors: Maxim A. Bolshtyansky, Millstone, NJ (US); Alexei N. Pilipetskii, Colts Neck, NJ (US)

(73) Assignee: SubCom, LLC, Eatontown, NJ (US)

( * ) Notice: Subject to any disclaimer, the term of this patent is extended or adjusted under 35 U.S.C. 154(b) by 330 days.

(21) Appl. No.: 17/316,454

(22) Filed: May 10, 2021

(65) Prior Publication Data

US 2022/0357448 A1    Nov. 10, 2022

(51) Int. Cl.
  G01C 3/08   (2006.01)
  G01S 17/26  (2020.01)
  G01S 17/34  (2020.01)
  G01S 17/36  (2006.01)

(52) U.S. Cl.
  CPC .............. *G01S 17/34* (2020.01); *G01S 17/26* (2020.01); *G01S 17/36* (2013.01)

(58) Field of Classification Search
  None
  See application file for complete search history.

(56) References Cited

U.S. PATENT DOCUMENTS 10,193,620 B2 * 1/2019 Shiner .................... G01M 11/31
2018/0241468 A1 * 8/2018 Shiner ................ H04B 10/0771

FOREIGN PATENT DOCUMENTS

| CN | 101639379 A | * | 2/2010 | ............... G01H 9/00 |
| CN | 105547460 A | * | 5/2016 | ............... G01H 9/00 |
| JP | 2011526138 A | * | 9/2011 | ........... H04B 10/035 |

OTHER PUBLICATIONS

European Search Report dated Sep. 21, 2022, for the EP Patent Application No. 22168766.8 filed on Apr. 19, 2022, 6 pages.
https://cloud.google.com/blog/products/infrastructure/using-subsea-cables-to-detect-earthquakes; Downloaded on May 8, 2021; 6 pages.

* cited by examiner

*Primary Examiner* — Mark Hellner
(74) *Attorney, Agent, or Firm* — KDW Firm PLLC

(57) ABSTRACT

A line monitoring system may include a laser source to launch a plurality of pulsed probe signals; an optical transmission system, comprising a plurality of loopbacks, to receive the plurality of pulsed probe signals, and direct the plurality of pulsed probe signals through the plurality of loopbacks. The system may include a receiver to receive a plurality of return signals, derived from the plurality of pulsed probe signals from the transmission system, and a perturbance detection system, coupled to the receiver, to measure a phase difference between a polarization of a pair of return signals of the plurality of return signals. The pair of return signals may be received from a pair of loopbacks of the plurality of loopbacks, from a first loopback and a second return signal from a second loopback. The perturbance detection system may determine a location of a perturbation, based upon the phase difference.

18 Claims, 7 Drawing Sheets

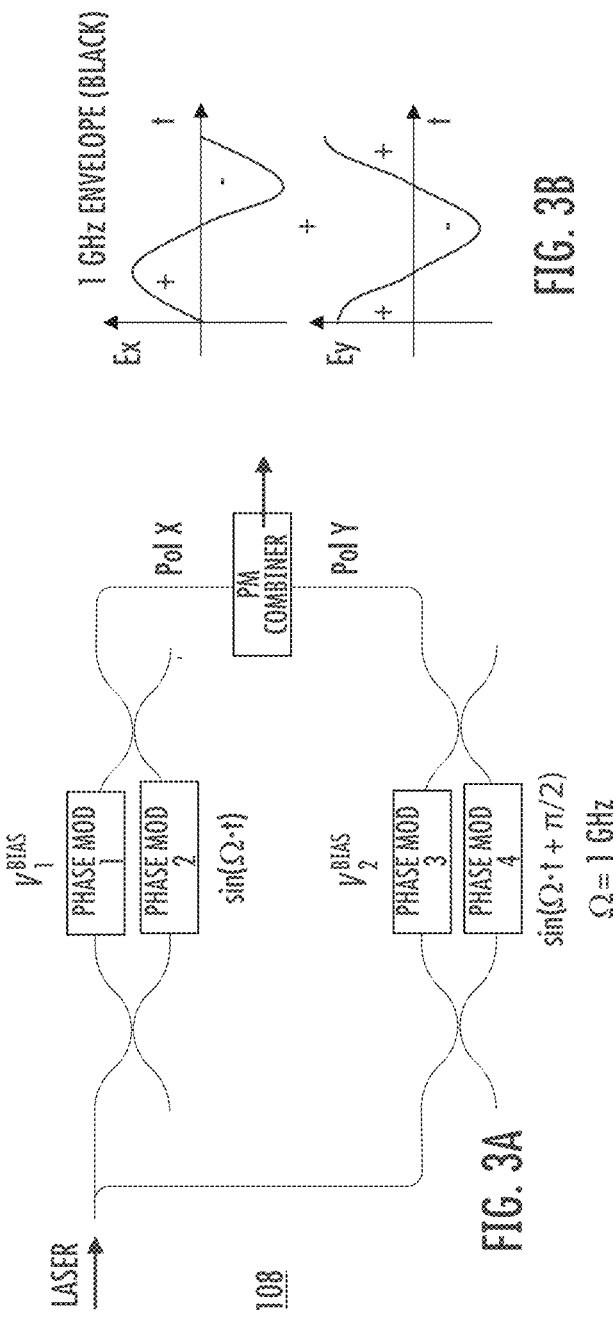
FIG. 3A
FIG. 3B
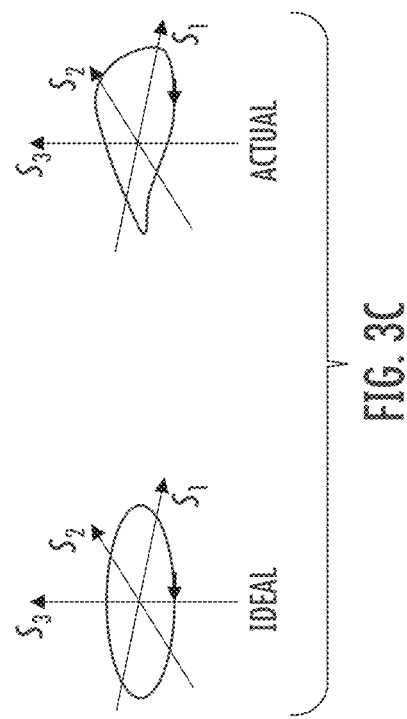
FIG. 3C

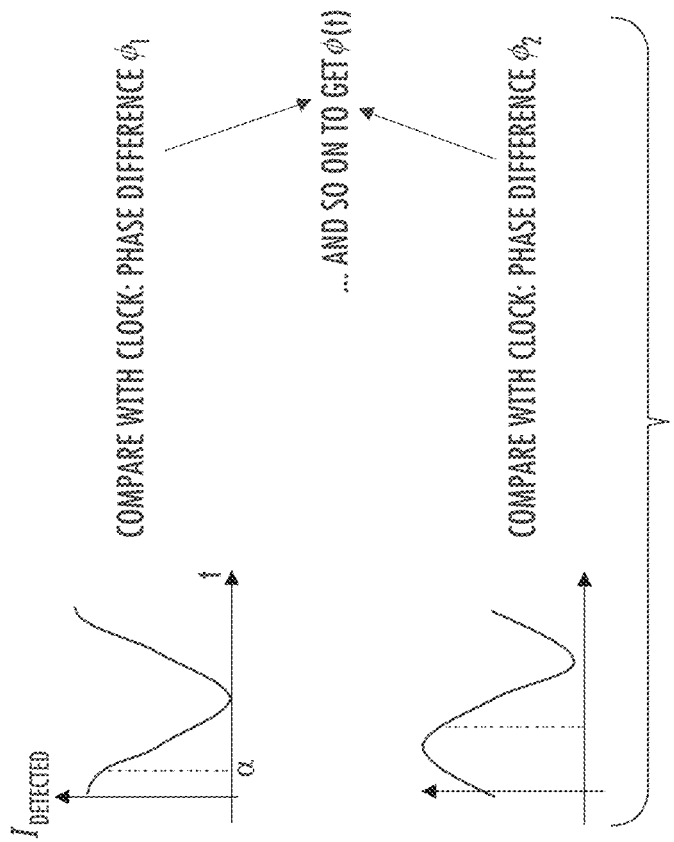
FIG. 4A ASSUME THAT POLARIZATION DETECTOR ALIGNED WITH S1
FIG. 4B AXIS OF ROTATION DUE TO PERTURBATION (NEARLY S3)
FIG. 4C COMPARE WITH CLOCK- PHASE DIFFERENCE $\phi_1$ / COMPARE WITH CLOCK- PHASE DIFFERENCE $\phi_2$ ... AND SO ON TO GET $\phi(t)$ PROBLEM: PERTURBATION AXIS IS NEAR DETECTOR VECTOR:
• NO CHANGE IN PHASE DUE TO PERTURBATION SOLUTION: LOOK AT OTHER $f$ IN $\Phi_i$ ($f,N$)

PROBLEM: DETECTOR IS NEAR $S_3$

• NO PHASE MEASUREMENT POSSIBLE
• 0 MODULATION AMPLITUDE

SOLUTIONS:
USE SECOND HARMONIC DISTORTION:
OR DETECT MORE THAN 1 POLARIZATION
OR AI TO EXTRACT INFORMATION FROM
ANOTHER OTHER DL-PMP

SPATIALLY RESOLVED PERTURBATION DETECTION USING LINE MONITORING SYSTEM

FIELD OF THE DISCLOSURE

This disclosure relates generally to the field of submarine communication and relates more particularly to techniques for measuring perturbations using line monitoring equipment.

BACKGROUND

Fiber optic cables connect far-flung continents along the ocean floor, and much of the internet's international traffic travels over these cables, which form part of the backbone of a transmission system. Generally, communications over fiber optic cables takes place using pulses of light that may encounter distortions during transmission over thousands of kilometers across an ocean. In addition to transmitting communication information, transmission systems may be equipped to provide information concerning the quality of the cables, using so-called line monitoring equipment. The line monitoring equipment may be used to send probe signals and detect return signals that provide information concerning anomalies within fiber optic cables within the transmission system, for example. More recently, it has been proposed that perturbations external to an optical fiber, such as earthquakes, may be detected by monitoring changes in optical signals, such as state of polarization (SOP) within the optical fiber. Recently, a change in SOP in an optical subsea cable has been reportedly detected is response to an earthquake that was located more than one thousand kilometers distant from the cable. However, systems and techniques that may detect perturbations that lie external to a transmission system, where the location is precisely spatially resolved are lacking.

With respect to these and other considerations the present disclosure is provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In a first embodiment, a line monitoring system is provided. The line monitoring system may include a laser source to launch a plurality of pulsed probe signals; an optical transmission system, comprising a plurality of loopbacks, to receive the plurality of pulsed probe signals, and direct the plurality of pulsed probe signals through the plurality of loopbacks. The system may include a receiver to receive a plurality of return signals, derived from the plurality of pulsed probe signals from the optical transmission system, and a perturbance detection system, coupled to the receiver, to measure a phase difference between a polarization of a pair of return signals of the plurality of return signals. The pair of return signals may be received from a pair of loopbacks of the plurality of loopbacks, from a first loopback and a second return signal from a second loopback. The perturbance detection system may further determine a location of a perturbation, based upon the phase difference.

In another embodiment, a method of locating a perturbation using a transmission system is provided. The method may include launching a probe beam from a laser probe source, the probe beam comprising a plurality of pulsed probe signals. The method may include detecting a plurality of return signals, derived from the plurality of pulsed probe signals, wherein the plurality of return signals are received from a plurality of loopbacks, disposed along the optical transmission system. The method may also include measuring a phase difference between a polarization of the pair of return signals of the plurality of return signals, the pair of return signals being received from a pair of loopbacks of the plurality of loopbacks, from a first loopback and a second return signal from a second loopback, and determining a location of a perturbance, external to the optical transmission system, based upon the phase difference.

In a further embodiment, a line monitoring system may include a laser source to launch a plurality of pulsed probe signals, a polarization rotator, disposed to rotate a polarization of the plurality of pulsed probe signals, and an optical transmission system, comprising a plurality of loopbacks, disposed to receive the plurality of pulsed probe signals, and direct the plurality of pulsed probe signals through the plurality of loopbacks. The line monitoring system may further include a receiver to receive a plurality of return signals, derived from the plurality of pulsed probe signals from the optical transmission system; and a perturbance detection system, coupled to the receiver. The perturbance detection system may be arranged to measure a phase difference between a polarization of a pair of return signals of the plurality of return signals, the pair of return signals being received from a pair of loopbacks of the plurality of loopbacks, from a first loopback and a second return signal from a second loopback.

BRIEF DESCRIPTION OF THE DRAWINGS

FIG. 3A shows one implementation of a polarization rotator 108, according to embodiments of the disclosure.

FIG. 3B shows the outputs of the electric field in X and Y for one cycle of a sinusoidal function operating at 1 GHz;

FIG. 3C shows the movement of the Stokes vector generated by a polarization rotator, in an ideal case, and in a real-use case;

FIGS. 4A-4C illustrate principles of polarization decoding through modulation phase detection, according to embodiments of the disclosure;

DETAILED DESCRIPTION

The present embodiments may be useful to detect and locate perturbances, including subsea earthquakes, using line monitoring equipment (LME) of an undersea communication system. In various embodiments, a loopback system associated with line monitoring equipment is employed to generate a plurality of return signals that are employed to determine location information regarding perturbances. An LME transmitter may generate signals with a particular polarization, where a receiver may measure the phase of a returned polarization rotation to locate a perturbation.

Figure 1:
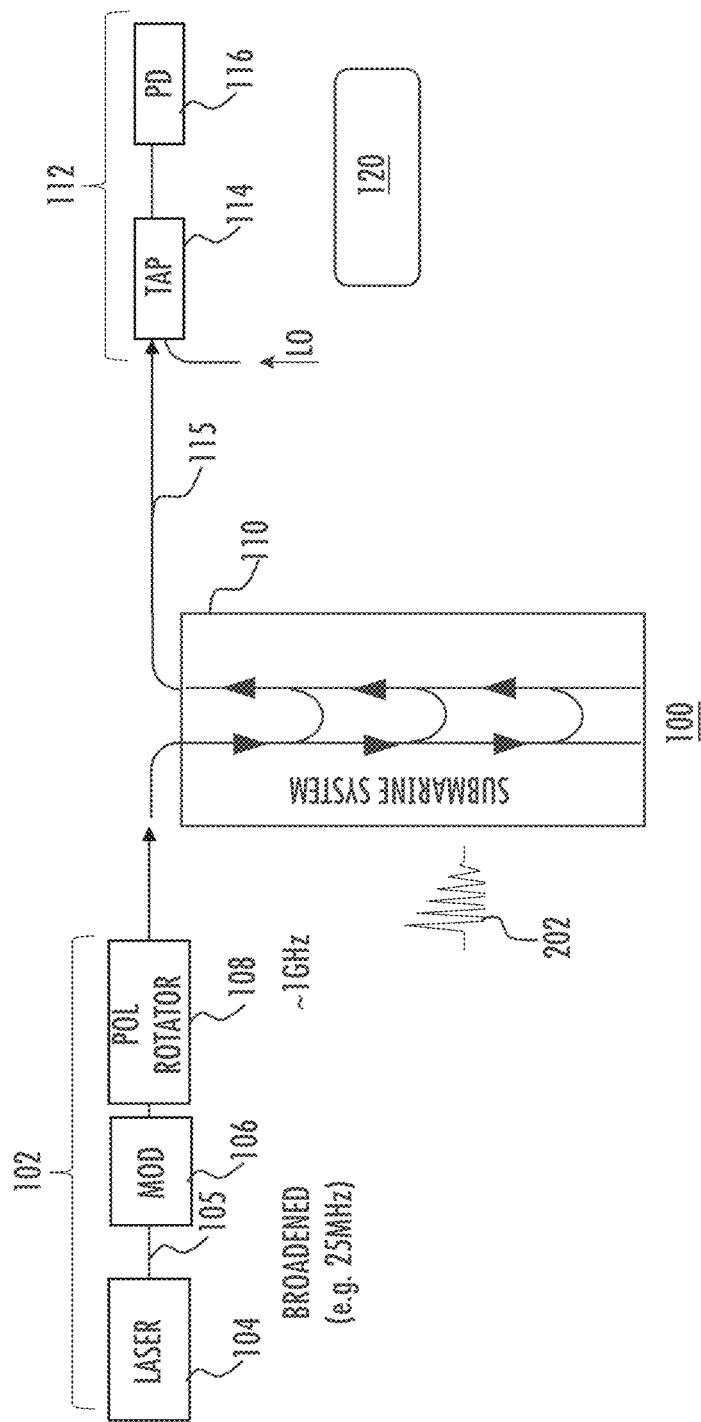
FIG. 1 is a schematic diagram illustrating an exemplary embodiment of a line monitoring system for testing an optical fiber, in accordance with the present disclosure.

In various embodiments, a line monitoring system is provided, as generally shown in FIG. 1. The line monitoring system 100 of FIG. 1 employs a transmitter 102, to generate signals that are transmitted through an optical transmission system, shown as submarine system 110. The submarine system 110 may include a plurality of loopbacks, spaced at intervals, along a seabed, for example. The line monitoring system 100 further includes a receiver 112, configured to receive a plurality of return signals, derived from the signals launched from the transmitter 102.

In various embodiments, the transmitter 102 includes a laser source 104, a modulator 106, and polarization rotator 108. Laser source 104 may generate a probe beam composed of a plurality of pulsed probe signals, shown as probe beam 105.

According to various embodiments of the disclosure, the modulator 106, may broaden the bandwidth of the pulsed probe signals, to a suitable bandwidth, such as in the range of 25 MHz, such as 10 MHz, 25 MHz, 50 MHz, 100 MHz, or similar bandwidth value according to various non-limiting embodiments. Considerations for selection of the targeted bandwidth include the minimum value for an electrical filter used to detect a return signal.

The polarization rotator 108 is disposed between the laser source 104 and the submarine system 110, and is provided to rotate the polarization of the plurality of pulsed probe signals generated by the laser source 104, at a specific rotation frequency. In some non-limiting examples, the rotation frequency being in a range of 0.5 GHz and 5 GHz, such as 1 GHz.

In various embodiments, the pulse length of the pulsed probe signals generated by the laser source 104 may be any suitable length. In particular embodiments, the pulse length of the pulsed probe signals that constitute the probe beam 105 may be shorter than the time delay between different loopback paths of the submarine system 110. In particular, the pulsed probe signals of the probe beam 105 may characterized by a pulse length, while the submarine system 110 is characterized by a local differential travel time for a probe signal when conducted through adjacent loopbacks in the submarine system 110. For specific embodiments, the pulse length of these probe signals may be set to be less than the local differential travel time, as defined above. Moreover, according to some embodiments, the pulse frequency of the probe beam may be such that a given probe signal is returned to a receiver through all loopbacks of the transmission system before a next probe signal is launched. In other words, the pulse period of the probe beam may be greater than a maximal travel time, where the maximal travel time means a duration for a pulsed probe signal to travel from the laser source and return to a receiver, when conducted through a last loopback, most distant from the laser source. Thus, each return signal for a first pulsed probe signal is received at the receiver 112 before the laser source 104 generates a second pulsed probe signal, immediately subsequent to the first pulsed probe signal.

Turning to the receiver 112, this receiver 112 may be arranged as an optical heterodyne. The receiver 112 includes a photodetector 116 and return tap 114, arranged to extract information from the return signals 115, such as phase or frequency modulation of the return signals, where the return signals are compared with standard or reference light from a "local oscillator"(LO), that would have a fixed offset in frequency and phase from the signal if the signal carried no information.

The line monitoring system 100 futher includes a phase measurement system 120. As detailed below, this phase measurement system 120 may include various components (not separately shown) to monitor the polarization phase difference between different return signals, and may determine the location of a perturbation based upon the phase difference. More particularly, the polarization s difference may be monitored between a pair of return signals received from a pair of loopbacks of the submarine system 110.

As further shown in FIG. 1, the receiver 112 may include a return tap 114, where the return tap has a first input to receive the return signals from the submarine system 110, and also has a second input to receive a polarized light signal. The return tap 114 is connected via an output to a photodetector 116.

Figure 2:
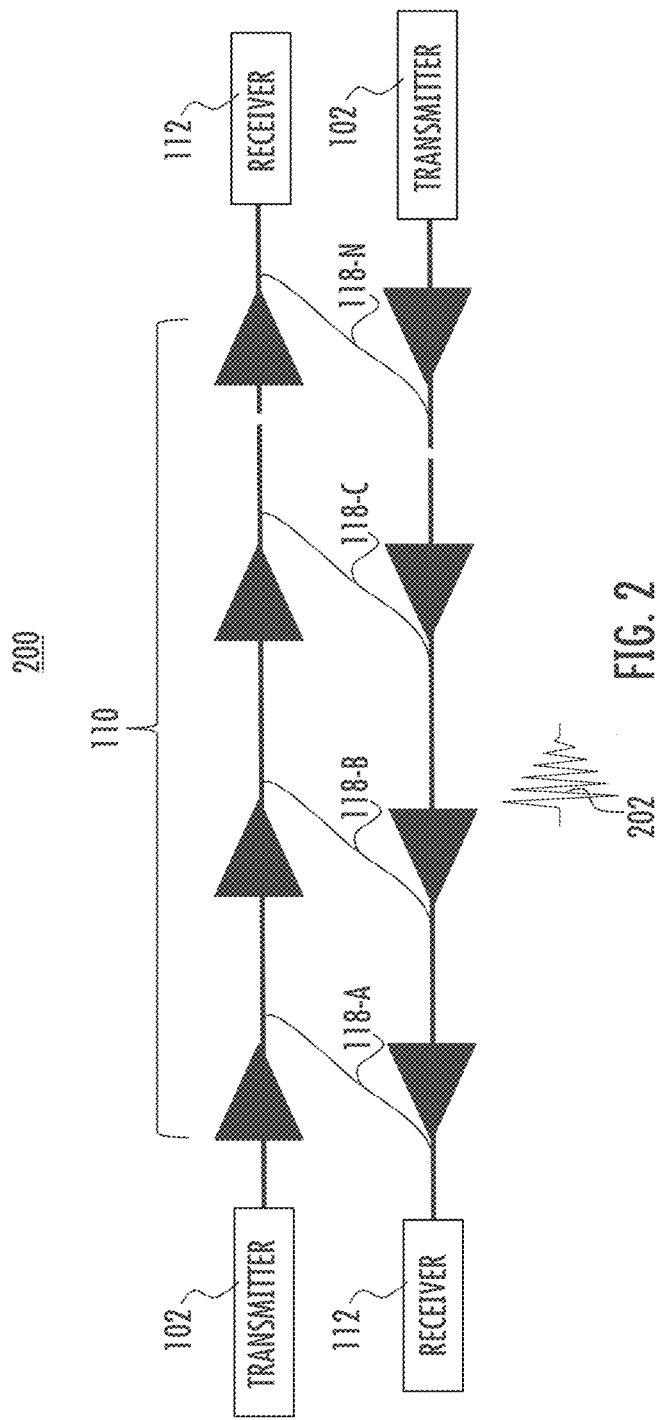
FIG. 2 presents details of an LME system, according to embodiments of the disclosure.

FIG. 2 presents details of an LME system 200, showing loopbacks of the submarine system 110. For simplicity, just loopbacks that loop back a pulsed probe signal from the right side are shown. According to various embodiments, the submarine system 110 may have loopbacks in the opposite direction as well, but these are not shown in the figure. In this example, the monitoring of a perturbation 202 is performed from the left side of the figure. In the illustration of FIG. 2, the loopbacks are shown as loopbacks 118-A to 118-N, while according to various embodiments, the number of loopbacks may be set according to the size of length of the submarine system 110. Thus, for a transmission system length of several thousand kilometers and a loopback spacing of 100 km, the number of loopbacks may number in the several dozen. As detailed below, a probe beam generated by a transmitter may generate a plurality of return signals through the different loopbacks, where the different return signals are received by a receiver and analyzed in a manner that serves to establish the location of a perturbance, external to the submarine system 110. In particular, the change in phase of polarization may be measured for pulsed probe signals traveling through the various loopbacks 118-A to 118-N. This change in phase of polarization may be used to establish phase difference of polarization between pulsed probe signals directed through adjacent loopbacks, such that detected changes in the polarization phase difference between a given set of loopbacks may be used to locate a perturbation.

FIG. 3A shows one implementation of the polarization rotator 108, according to embodiments of the disclosure. As illustrated, the signal emitted from a laser source is split and directed along two paths, where a C1 bias is applied to the upper branch and a V2 bias to the lower branch. The phase of upper branch is represented by $\sin(\Omega t)$, while the phase of the lower branch is represented by $\sin(\Omega t+\pi/2)$, where the value of $\Omega$ may be 1 GHz in one embodiment.

As shown in FIG. 3A, a polX signal from the upper branch and polY from the lower branch may be routed through a polarization maintaining combiner. The polarization rotator 108 may thus output a linear polarization rotating with a frequency of $\Omega$.

The outputs of the electric field in X and Y are shown in FIG. 3B for one cycle of a sinusoidal function operating at 1 GHz. Generally, a pulsed probe signal will be defined by a polarization state and may be characterized according to a set of Stokes parameters S1, S2, S3, where these parameters may define a (normalized) Stokes vector that will lie on a Poincaré sphere. The Poincaré sphere may be used to describe the polarization and changes in polarization of a propagating electromagnetic wave (light). This depiction provides a convenient way of representing polarized light, and of predicting how any given retarder will change the polarization form. Any given polarization state corresponds to a unique point on the Poincaré sphere. According to some conventions, the two poles of the Poincaré sphere represent left and right-hand circularly polarized light, while points on the equator indicate linear polarizations. All other points on the Poincaré sphere will represent elliptical polarization states.

FIG. 3C shows the movement of the Stokes vector generated by the polarization rotator 108, where the polarization thus generated moves mostly around the circle on a Poincare sphere in the ideal case, while in various real-use cases (actual), the polarization does not lie within a circle.

FIGS. 4A-4C illustrate principles of polarization decoding through modulation phase detection, according to embodiments of the disclosure. In accordance with various embodiments, and for the purposes of ease of explanation, a polarization sensitive detector, used at receiver 112, may detect received polarization aligned just along S1, shown in FIG. 4A. As further illustrated with respect to FIG. 4B, it may be assumed that a perturbation due to birefringence will rotate the Poincare sphere around an axis, in this example nearly aligned with S3, and shown as the dashed bold line. As an example, the value of the rotation frequency may be 1 GHz. In FIG. 4C, the detected intensity is shown as a function of time for two different cases. The sinusoidal variation of intensity as a function of time is shown. The curves may be compared to a clock to establish the phase difference, $\phi$, to obtain, $\phi(t=t_1)$, $\phi(t=t_2)$ and so forth, to generate the result $\phi_r$. In other embodiments, even when the detector is not aligned along S3, a phase shift will be detected at any rate.

Figure 5A:
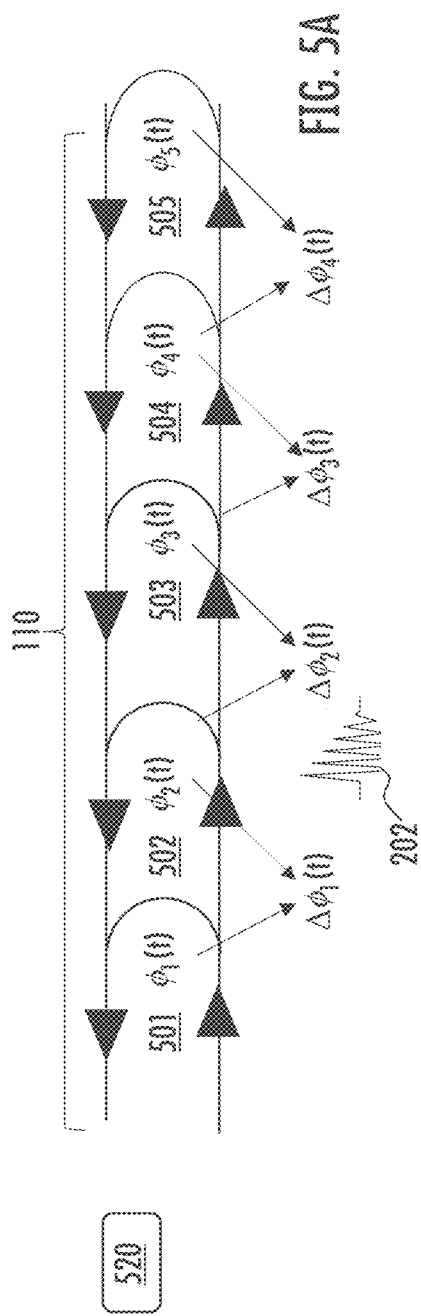
FIG. 5A illustrates the components for determining perturbation location using an LME system, in accordance with various embodiments of the disclosure.

FIG. 5A illustrates the components for determining a perturbation using an LME system, in accordance with various embodiments of the disclosure. The system includes a receiver 520 (the transmitter is not shown, but see transmitter 102) and a submarine system 110, depicted as a series of loopbacks, which loopbacks may be positioned at repeaters, having a characteristic spacing between loopbacks across the transmission system. For example, a suitable spacing between loopbacks may be 50 km or 100 km in two non-limiting embodiments. As noted previously, the perturbation 202 will affect the polarization phase shift detected between adjacent loopbacks differently, depending upon the location of the perturbation 202. In the example of FIG. 5A, there are shown five loopbacks 501-505, but the submarine system 110 may have many more, such as up to many dozen, depending upon the length of the transmission system. The loopback 501 generates a phase difference $\phi_1$ (t), an adjacent loopback, shown as loopback 502, generates a phase difference $\phi_2$ (t), while a next loopback, shown as loopback 503, generates a phase difference $\phi_3$ (t). The difference between $\phi_1$ (t) and $\phi_2$ (t), may be represented by a pairwise phase difference $\Delta\phi_1$ (t), while the difference between $\phi_2$(t) and $\phi_3$(t), may be represented by $\Delta\phi_2$(t). Likewise loopback 504 may be represented by a phase difference $\phi_4$(t) and loopback 505 may be represented by a phase difference $\phi_5$(t), and so forth, where each successive pair is associated with a delta, such as by $\Delta\phi_3$(t), by $\Delta\phi_4$(t), and so forth.

When a perturbation 202 is located between two particular loopbacks, the phase difference between the two loopbacks will be affected. In other words, a phase difference between the loopbacks in question will be altered. In the example of FIG. 5A, the $\Delta_2$(t) may be affected by the perturbation 202, while other phase differences ($\Delta\phi_1$(t), $\Delta\phi_3$(t), $\Delta\phi_4$(t), etc.) between other loopback pairs of the submarine system 110 are not affected. This result may be explained in the following manner: Suppose that before the scenario of FIG. 5A, the following phases $\phi_1\phi_2\phi_3\phi_4$, . . . are first measured in the absence of perturbation 202, and represented by the numerical values:1, 1, 1, 1, . . . (the values for additional loopbacks of submarine system 110 are is also). The pair-wise phase differences can then be calculated as: $\Delta\phi_1=\phi_2-\phi_1$; $\Delta\phi_2=\phi_3-\phi_2$; $\Delta\phi_3=\phi_4-\phi_3$ are 0, 0, 0, . . . (the values for additional pairwise phase differences of additional loopback pairs of the submarine system 110 are 0s also). Suppose additionally that in the presence of the perturbation 202, the perturbation 202 has a value of 1 (as an example) between loopback 502 and loopback 503. In this case, starting from the loopback 503, and for loopbacks more distant from receiver 520, all phases $\phi_3\phi_4\phi_5\phi_6$ are increased by the value of the perturbation of 1, yielding the following values for $\phi_1\phi_2\phi_3\phi_4$ :1, 1, 2, 2 . . . (the values of the rest of the phases in the more distant loopbacks also are 2s). But, for the above scenario, the pairwise phase difference deltas $\Delta\phi_1\Delta\phi_2\Delta\phi_3$ become 0, 1, 0, . . . (the rest of the pairwise phase differences between higher number loopback pairs are also 0). That is, just one pairwise phase difference delta ($\Delta\phi_2$) is modified despite the fact that all phases associated with loopbacks beyond $\phi_3$ are modified by a value of 1. Said differently, the location of this modified pairwise phase difference ($\Delta\phi_2$) represents the location along the transmission system where loopbacks more distant to the receiver 520 exhibit modified polarization phase, and loopbacks more proximate the receiver 520 do not exhibit modified polarization phase in response to the perturbation.

Figure 5B:
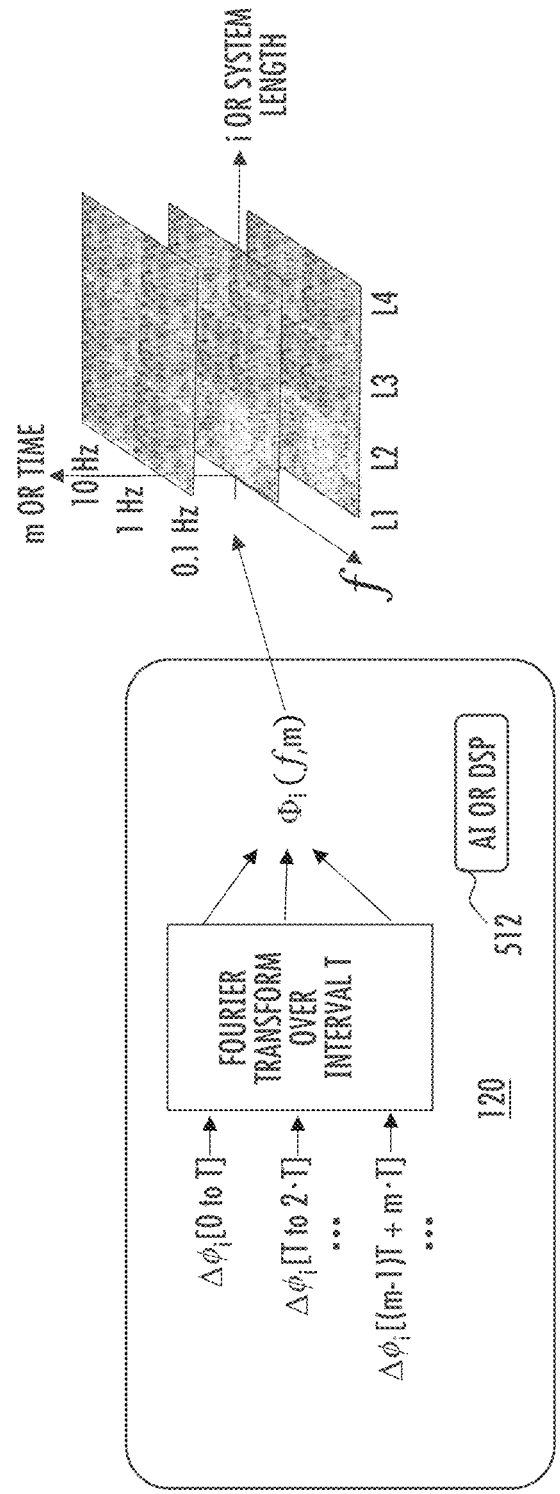
FIG. 5B illustrates one implementation of perturbation location, where a Fourier analysis is performed, with an output as shown.

Note that different types of perturbations may be expected to generate disturbances at different characteristic frequencies. For earthquakes, a suitable frequency to be monitored may be in the range of 1 Hz. Exemplary ranges for monitoring earthquakes may cover the range of 0.1 Hz to 5 Hz in some embodiments. As shown in FIG. 5B, in one implementation, a Fourier analysis can be performed, with an output as shown, such as a power spectrum. In other embodiments, other algorithms may be employed.

In the example of FIG. 5B, the change in polarization phase difference may be represented as a change in intensity, which change is color coded (different shading) in the illustration shown. The horizontal axis in FIG. 5B represents the position along an optical transmission system, which distance may be specified at the level of the nearest two repeaters or loopbacks to the disturbance. The vertical axis may represent time. In FIG. 5B, a series of three time slices are shown, representing three different instances. The third axis represents the frequency for perturbances being monitored. The presence of a disturbance will thus be represented by a change in intensity at a given position along the transmission system and at a given frequency, characteristic of that disturbance. In the example shown, the disturbance is detected toward the left, which position may represent the location of two loopbacks L1 and L2 of a transmission system that are relatively nearer to a detector. The disturbance is detected at a frequency located toward the front, which frequency may represent 1 Hz, for example.

Thus, a 1 Hz earthquake located between L1 and L2 will tend to cause changes in polarization difference at a location between the loopbacks L1 and L2 that takes place at a frequency of 1 Hz. By monitoring the Fourier transform output for this frequency range, periodically, or continuously, an earthquake generating a perturbance at this frequency that affects the cable of a transmission system, will be detected and located to a position near the loopbacks L1 and L2.

The representation in FIG. 5B is merely for the purposes of illustration, and according to various embodiments, a perturbation may be determined by using a suitable processing component 512 of the phase measurement system 120, such as a digital signal processor, or artificial intelligence system, in order to analyze detected polarization phase changes (that are detected at a receiver, such as receiver 112) as a function of frequency, position along a transmission system, and so forth.

While the aforementioned approaches may be employed for general cases of a perturbation, in some embodiments, the detection of polarization phase shift may be modified to account for special cases.

Figure 6:
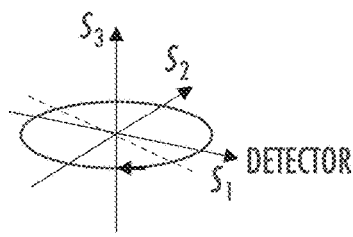
FIG. 6 shows the geometry of a special use example where the axis of the perturbation is aligned along or close to the detector vector S1.

In FIG. 6, an example is shown where the axis of the perturbation is aligned along or close to the detector vector S1. In this example, another f in $\phi_i(f, N)$ may be employed.

Figure 7:
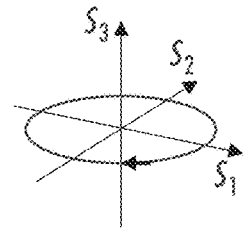
FIG. 7 shows the geometry of another special use example, where the detector is aligned along S3.

In the special case of FIG. 7, the detector may be aligned along S3, where phase measurement is inoperative due to the zero modulation amplitude. In this circumstance, according to one embodiment, a second harmonic distortion may be applied. In another embodiment, multiple polarizations may be detected. In a further embodiment, AI (artificial intelligence) may be employed to extract information from another other DL-PMP.

"Alternatively, in some embodiments, more than one receiver detector may be employed, each aligned along a different axis on the Poincare sphere. In one example, a first detector may be aligned along S3, while a second detector is aligned along S2, for purposes of illustration. While the first detector aligned along S3 may fail to sense phase in the above scenario, the S2 detector will measure phase readily. In other words, when that circular trajectory rotates around S3, its projection to S3 does not change, but it does change to S2. Of course, in embodiments using two separate receiver detectors, then a splitter (e.g., 3 dB splitter) will also be needed to split the returned optical signal into two paths, where each path would contain a tap for mixing the local oscillator and detector.

In still further embodiments, the use of a full coherent receiver may be employed that can detect the exact state of polarization at any moment of time. In this latter embodiment, the architecture will be more complex, as will be appreciated by those of skill in the art.

Figure 8:
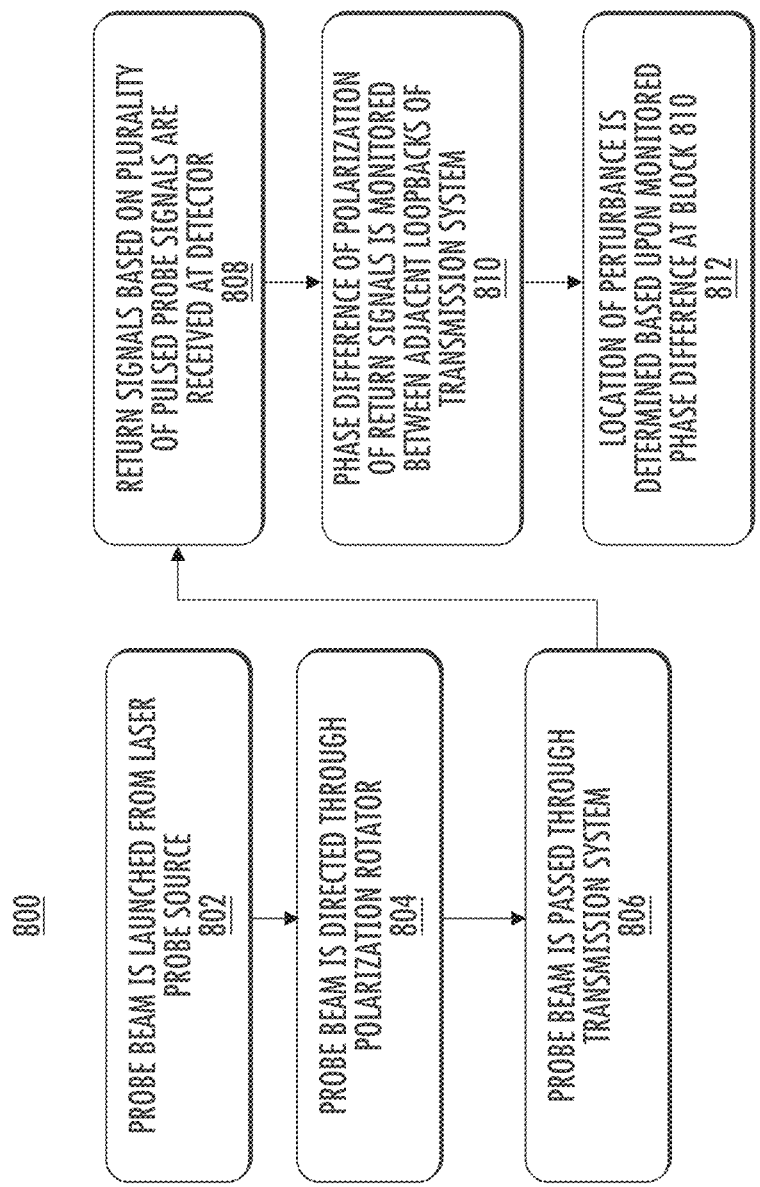
FIG. 8 presents an exemplary process flow.

FIG. 8 presents an exemplary process flow 800. At block 802, a probe beam is launched from a laser probe source. The laser probe source may be a pulsed laser source in some embodiments. The probe beam may be broadened in some embodiments, to a suitable bandwidth, such as 10 MHz, 25 MHz, 50 MHz, 100 MHz, or similar value according to various non-limiting embodiments.

At block 804, the probe beam is directed through a polarization rotator. The polarization rotator may rotate the plurality of pulsed probe signals generated by the laser source, at a specific rotation frequency. In some non-limiting examples, the rotation frequency being in a range of 0.5 GHz and 5 GHz, such as 1 GHz. According to some embodiments, the polarization rotator may use a known components such as birefringent waveplates.

At block 806, the probe beam is passed through a transmission system, such as a long-haul subsea optical communication system. As such, the transmission system may include a plurality of loopbacks. The loopbacks may be separated from one another along the transmission system, in some examples, at a regular spacing, such as tens of kilometers. The different loopbacks along the transmission system may create different paths between transmitter (such as at a laser source) and a receiver. In particular, the different paths among the different loopbacks may be characterized by a differential travel time for a probe signal when conducted through paths of adjacent loopbacks. According to some embodiments, the pulse length of the probe beam may be set to be less than the differential travel time. According to some embodiments, the pulse frequency of the probe beam may be such that a given probe signal is returned to a receiver through all loopbacks of the transmission system before a next probe signal is launched.

At block 808, return signals based on the plurality of pulsed probe signals are received at a detector. In some embodiments, the detector may be a polarization sensitive detector. In some examples, the detector may be oriented to receive polarized signals along the S1 axis of the Poincare sphere.

At block 810, the phase difference of the return signals is monitored between adjacent loopbacks of the transmission system. The phase difference may be monitored for all pairs of adjacent loopbacks of the transmission system, or fewer than all pairs of adjacent loopbacks of the transmission system.

At block 812, a location of a perturbance is determined based upon the monitored phase difference at block 810. In one example, a Fourier analysis is performed on phase difference data selected over a suitable frequency range such as on the order of 1 Hz, where a phase difference change is manifest as a change in intensity as a function of location along the transmission system, according to the Fourier analysis.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:
1. A line monitoring system, comprising:
a laser source to launch a plurality of pulsed probe signals;
an optical transmission system, comprising a plurality of loopbacks, disposed to receive the plurality of pulsed probe signals, and direct the plurality of pulsed probe signals through the plurality of loopbacks;
a polarization rotator, disposed between the laser source and the optical transmission system, to rotate a polarization of the plurality of pulsed probe signals,
a receiver to receive a plurality of return signals, derived from the plurality of pulsed probe signals from the optical transmission system; and
a perturbance detection system, coupled to the receiver, and arranged to:
measure a phase difference between a polarization of a pair of return signals of the plurality of return signals, the pair of return signals being received from a pair of loopbacks of the plurality of loopbacks; and determine a location of a perturbance, based upon the phase difference, wherein the plurality of return signals are each characterized by a phase of a polarization rotation returned by a given loopback, and wherein the perturbance location system is arranged to determine the location by:

measuring a change in a value of the phase difference, wherein the phase difference is associated with a polarization returned by adjacent loopbacks of the pair of loopbacks.

2. The line monitoring system of claim 1, a rotation frequency of the polarization rotator being in a range of 0.5 GHz and 5 GHz.

3. The line monitoring system of claim 1, the receiver comprising a return tap, the return tap having a first input to receive the plurality of return signals, and a second input to receive a polarized light signal, and an output coupled to a photodetector.

4. The line monitoring system of claim 1, wherein the plurality of pulsed probe signals have a local differential travel time, the local differential travel time defined as a difference between a first duration, for a probe signal traveling from the laser source and returning to the receiver, when conducted through a first loopback, and a second duration, for the probe signal traveling from the laser source and returning to the receiver when conducted through a second loopback, adjacent to the first loopback, and wherein the laser source is configured to generate the plurality of pulsed probe signals at a pulse length, less than the local differential travel time, wherein the plurality of return signals do not overlap one another at the receiver.

5. The line monitoring system of claim 4, wherein the plurality of pulsed probe signals are characterized by a pulse period, wherein the pulse period is greater than a maximal travel time, the maximal travel time comprising a duration for the pulsed probe signal to travel from the laser source and return to the receiver, when conducted through a last loopback, most distant from the laser source, wherein each return signal for a first pulsed probe signal is received at the receiver before the laser source generates a second pulsed probe signal, immediately subsequent to the first pulsed probe signal.

6. The line monitoring system of claim 1, the plurality of pulsed probe signals being defined by a polarization state, wherein the receiver is polarization sensitive.

7. The line monitoring system of claim 1, wherein the perturbance is characterized by a perturbance frequency, wherein the perturbance detection system comprises a logic circuit to generate a power spectrum for the plurality of return signals over a frequency range spanning the perturbation frequency.

8. The line monitoring system of claim 7, wherein the perturbation comprises a frequency in a range of 0.1 Hz and 10 Hz.

9. A method of locating a perturbation using a transmission system, comprising:

launching a probe beam from a laser probe source, the probe beam comprising a plurality of pulsed probe signals, the launching of the probe beam comprising directing the probe beam to a polarization rotator, and rotating the probe beam at a predetermined frequency;

detecting, at a receiver, a plurality of return signals, derived from the plurality of pulsed probe signals, wherein the plurality of return signals are received from a plurality of loopbacks, disposed along the transmission system;

measuring a phase difference between a polarization of a pair of return signals of the plurality of return signals, the pair of return signals being received from a pair of loopbacks of the plurality of loopbacks; and determining a location of a perturbance, external to the optical transmission system, based upon the phase difference.

10. The method of claim 9, the measuring the phase difference comprising:

monitoring a phase difference of the polarization between a plurality of pairs of return signals, derived from a plurality of pairs of adjacent loopbacks of the transmission system.

11. The method of claim 9, the monitoring the phase difference comprising receiving the plurality of return signals at an optical heterodyne circuit, wherein a polarization detector of the optical heterodyne circuit is polarization sensitive.

12. The method of claim 9, comprising: generating the plurality of pulsed probe signals at a predetermined pulse length, wherein the transmission system is characterized by a differential travel time for a probe signal of the plurality of pulsed probe signals when the probe signal is conducted through adjacent loopbacks of the plurality of loopbacks, and wherein the predetermined pulse length is less than the differential travel time.

13. The method of claim 12, wherein the plurality of pulsed probe signals are characterized by a pulse period, the method further comprising setting the pulse period to be greater than a maximal travel time, the maximal travel time comprising a duration for a pulsed probe signal of the plurality of pulsed probe signals to travel from the laser source and return to the receiver, when conducted through a last loopback, most distant from the laser source, wherein each return signal for a first pulsed probe signal is received at the receiver before the laser source generates a second pulsed probe signal, immediately subsequent to the first pulsed probe signal.

14. The method of claim 10, wherein a perturbance is determined when a change of the phase difference is detected between a polarization of a given pair of return signals, derived from a corresponding pair of adjacent loopbacks.

15. The method of claim 9, wherein the perturbance is characterized by a perturbance frequency, the method further comprising:

generating a power spectrum for the plurality of return signals over a frequency range spanning the perturbance frequency;

monitoring an intensity of the power spectrum over time over a frequency range that includes the perturbance frequency, wherein the intensity corresponds to the phase difference; and determining the location of the perturbance when the intensity exceeds a predetermined threshold.

16. The method of claim 15, wherein the power spectrum is monitored as a function of frequency and loopback position along the transmission system.

17. A line monitoring system, comprising:
a laser source to launch a plurality of pulsed probe signals;
a polarization rotator, disposed to rotate a polarization of the plurality of pulsed probe signals,
an optical transmission system, comprising a plurality of loopbacks, disposed to receive the plurality of pulsed probe signals, and direct the plurality of pulsed probe signals through the plurality of loopbacks;
a receiver to receive a plurality of return signals, derived from the plurality of pulsed probe signals from the optical transmission system; and
a perturbance detection system, coupled to the receiver, and arranged to:
measure a phase difference between a polarization of a pair of return signals of the plurality of return signals, the pair of return signals being received from a pair of loopbacks of the plurality of loopbacks.

18. The line monitoring system of claim 17, wherein
wherein the plurality of return signals are each characterized by a phase of a polarization rotation returned by a given loopback, and
wherein the perturbance detection system is arranged to determine a location of a perturbance by: measuring a change in a value of the phase difference, wherein the phase difference is associated with a polarization returned by adjacent loopbacks of the pair of loopbacks.

* * * * *